(12) United States Patent
Matsumoto et al.

(10) Patent No.: US 8,962,104 B2
(45) Date of Patent: Feb. 24, 2015

(54) LIQUID CRYSTAL DISPLAY PANEL AND LIQUID CRYSTAL DISPLAY DEVICE

(75) Inventors: Toshihiro Matsumoto, Osaka (JP);
Yuichi Kawahira, Osaka (JP);
Masayuki Kanehiro, Osaka (JP);
Shoutarou Kawakami, Saitama (JP);
Gou Sudou, Saitama (JP)

(73) Assignees: Sharp Kabushiki Kaisha, Osaka (JP);
DIC Corporation, Tokyo (JP)

( * ) Notice: Subject to any disclaimer, the term of this patent is extended or adjusted under 35 U.S.C. 154(b) by 135 days.

(21) Appl. No.: 13/824,587

(22) PCT Filed: Sep. 13, 2011

(86) PCT No.: PCT/JP2011/070838
§ 371 (c)(1),
(2), (4) Date: Mar. 18, 2013

(87) PCT Pub. No.: WO2012/039321
PCT Pub. Date: Mar. 29, 2012

(65) Prior Publication Data
US 2013/0208213 A1  Aug. 15, 2013

(30) Foreign Application Priority Data
Sep. 21, 2010  (JP) ................................. 2010-211156

(51) Int. Cl.
| | | |
|---|---|---|
| C09K 19/34 | (2006.01) | |
| C09K 19/32 | (2006.01) | |
| C09K 19/20 | (2006.01) | |
| C09K 19/30 | (2006.01) | |
| G02F 1/1333 | (2006.01) | |
| C09K 19/02 | (2006.01) | |
| C09K 19/44 | (2006.01) | |
| C09K 19/12 | (2006.01) | |

(52) U.S. Cl.
CPC ............... *C09K 19/02* (2013.01); *C09K 19/322* (2013.01); *C09K 19/3402* (2013.01); *C09K 19/44* (2013.01); *C09K 2019/122* (2013.01); *C09K 2019/3004* (2013.01); *C09K 2019/3009* (2013.01); *C09K 2019/301* (2013.01); *C09K 2019/3425* (2013.01)
USPC ............. 428/1.1; 349/61; 349/182; 349/186; 252/299.01; 252/299.61; 252/299.62; 252/299.63; 252/299.66

(58) Field of Classification Search
CPC .. C09K 19/02; C09K 19/322; C09K 19/3402; C09K 19/44; C09K 2019/3009; C09K 2019/301; C09K 19/3425; G02F 1/1333; G02F 1/1336
USPC ............ 252/299.01, 299.61, 299.62, 299.63, 252/299.66; 349/61, 182, 184; 428/1.1
See application file for complete search history.

(56) References Cited

U.S. PATENT DOCUMENTS

| | | | |
|---|---|---|---|
| 8,519,936 B2 * | 8/2013 | Kosuge | ........................ 345/101 |
| 2005/0247910 A1 | 11/2005 | Sugiura et al. | |
| 2006/0163536 A1 | 7/2006 | Matsumoto et al. | |
| 2009/0121186 A1 | 5/2009 | Nagashima | |

FOREIGN PATENT DOCUMENTS

| | | |
|---|---|---|
| DE | 195 22 195 A1 | 12/1995 |
| JP | 2001-040354 A | 2/2001 |
| JP | 2002-069449 A | 3/2002 |
| JP | 2005-035986 A | 2/2005 |
| JP | 2009-084365 A | 4/2009 |
| WO | 2005/000995 A1 | 1/2005 |
| WO | 2006/088177 A1 | 8/2006 |

OTHER PUBLICATIONS

Official Communication issued in International Patent Application No. PCT/JP2011/070838, mailed on Nov. 22, 2011.

* cited by examiner

*Primary Examiner* — Shean C Wu
(74) *Attorney, Agent, or Firm* — Keating & Bennett, LLP

(57) ABSTRACT

The present invention provides a liquid crystal display panel that suppresses the temperature dependence of transmittance-gradation characteristics and thus overcomes problems in which significant changes in transmittance-gradation characteristics are caused by the effects of environmental temperature and a light source to lead to the degradation of display performance, and a liquid crystal display device including the liquid crystal display panel. The liquid crystal display panel of the present invention includes a liquid crystal medium containing a plurality of liquid crystal compounds each having a negative dielectric constant anisotropy, the liquid crystal medium being held between a first substrate and a second substrate that are located opposite each other, and a side of each of the substrates in contact with the liquid crystal medium having vertical alignment properties for the liquid crystal compounds. The liquid crystal medium in the liquid crystal display panel contains a liquid crystal composition (1) or a liquid crystal composition (2) having a specific composition. In the liquid crystal display panel, Δγ which pertains to a transmittance-gradation characteristic curve coefficient and which is calculated from specific expressions is 0.2 or less.

5 Claims, 7 Drawing Sheets

MAXIMUM: 42.53°C
MEAN: 33.75°C
MINIMUM: 26.13°C

LIQUID CRYSTAL DISPLAY PANEL AND LIQUID CRYSTAL DISPLAY DEVICE

TECHNICAL FIELD

The present invention relates to a liquid crystal display panel and a liquid crystal display device. More specifically, the present invention relates to a transmissive-mode liquid crystal display panel in which displaying is performed with a nematic liquid crystal, in particular, the panel operating in what is called a vertical alignment mode, in which liquid crystal molecules are aligned in a direction perpendicular to a substrate surface when no voltage is applied, and the panel including a light source, such as a backlight. In particular, the present invention relates to a liquid crystal display panel suitably applicable to a system for irradiating a panel with light from a light source using a light guide and a technique, such as local dimming, and to a liquid crystal display device including the liquid crystal display panel.

BACKGROUND ART

Liquid crystal displays (hereinafter, also referred to as "LCDs") have become widespread as lightweight, thin displays that achieve low-power consumption. In recent years, improvement in display quality and an increase in size have resulted in increased demand for large-sized liquid crystal television sets. LCDs are essential for daily life and business. For example, a liquid crystal display method is often employed for mobile use and various monitors. In the technical field of such LCDs, in order to enhance competitiveness in the market, there have been advances in the development of LCDs to improve display quality, such as an increase in viewing angle and improvement in contrast, and to impart a lot of functions.

In LCDs that have been developed so far, various display modes are used. The display modes are categorized by the arrangement state of liquid crystal molecules when no voltage is applied and the direction of an applied electric field. In particular, a liquid crystal display element in a longitudinal electric field mode in which the alignment of a liquid crystal is perpendicular to a substrate when no voltage is applied is referred to as a vertical alignment-mode element or a VA-mode element. This mode is advantageous to achieve a wide viewing angle and high contrast. Thus, the use of the mode is being expanded.

The basic structure and the operation principle of LCDs are as follows: A liquid crystal layer (liquid crystal medium) is held between substrates. The application of a voltage to electrodes arranged on the substrates changes an electric field state in the liquid crystal layer to control the alignment of liquid crystal molecules and to change the polarization state of light transmitted through the liquid crystal layer, thereby adjusting the quantity of light transmitted through a polarizing plate to change gradation levels. Thereby, an image is displayed. In the VA mode, the alignment state of liquid crystal molecules is controlled by the use of a nematic liquid crystal composition having a negative dielectric constant anisotropy. The display performance of LCDs is significantly affected by the display mode. The liquid crystal composition constituting the liquid crystal layer also greatly affects the display quality and performance.

With respect to the nematic liquid crystal composition having a negative dielectric constant anisotropy applicable to the VA mode and so forth, various liquid crystal molecules, compositions containing the liquid crystal molecules, and liquid crystal display elements are disclosed, the liquid crystal molecules containing compounds having trifluoronaphthalene skeletons and difluorochroman skeletons, derivatives thereof, and polycyclic compounds as additional components (for example, see PTLs 1 to 4). These literatures state that these liquid crystal compositions have high degrees of negative dielectric constant anisotropy and are capable of improving the display performance of the liquid crystal display elements. In addition, liquid crystal compositions and so forth containing compound groups having various difluorochroman skeletons and additional components (for example, see PTL 5) and compound groups and so forth having various trifluoronaphthalene skeletons (for example, see PTL 6) are disclosed.

Furthermore, a liquid crystal composition is disclosed which contains a compound group, serving as a first component, in which one or two alicyclic structures are bonded to a trifluoronaphthalene skeleton with an ether linkage, a compound group, serving as a second component, in which one or two alicyclic structures are bonded to a difluorochroman skeleton with an ether linkage, and so forth (for example, see PTL 7).

CITATION LIST

Patent Literature

PTL 1: Japanese Unexamined Patent Application Publication No. 2002-69449
PTL 2: International Publication No. 2006/088177
PTL 3: International Publication No. 2005/000995
PTL 4: Japanese Unexamined Patent Application Publication No. 2001-40354
PTL 5: Japanese Unexamined Patent Application Publication No. 2005-35986
PTL 6: German Patent Application Publication No. 19522195
PTL 7: Japanese Unexamined Patent Application Publication No. 2009-84365

SUMMARY OF INVENTION

Technical Problem

In a liquid crystal display panel, the surface temperature of the panel is changed by an environmental temperature and a backlight serving as a light source. With respect to the environmental temperature, the surface temperature is changed by a normal, everyday environment. In recent years, applications of liquid crystal displays have been extended, so that liquid crystal display panels have been attached to various apparatuses. Thus, liquid crystal display panels are required to be adapted to various usage environments. In this case, the surface temperature of the entire panel surface is changed by the environmental temperature. A relatively high-temperature region and a relatively low-temperature region may be formed on a panel surface by, for example, the effect of a panel surface temperature distribution due to an increase in the size of a liquid crystal television set and a lighting system of a backlight from a side of the panel surface (what is called an edge-lighting system), which is often used for mobile applications and so forth. In this case, the panel surface has different surface temperatures in different regions. In particular, in a technique for performing area control of the luminance of the backlight, what is called local dimming, in response to the luminance information of an image and so forth, the difference in surface temperature between an area where the backlight is lit and an area where the backlight is not lit may occur.

Meanwhile, in a liquid crystal display panel, transmittance-gradation characteristics are set. A signal to display an image is sent to the panel on the basis of the characteristics. Commonly, the transmittance-gradation characteristics are adjusted at 25° C. (normal temperature). Thus, when the temperature at the time of the adjustment is not matched to the surface temperature of the liquid crystal display panel, the transmittance-gradation characteristics shift.

When the transmittance-gradation characteristics shift, a change in transmittance between gradation levels differs from a set variation range, thus significantly degrading the display performance due to a phenomenon, such as the lack of gradation. Accordingly, in the related art, in order to control the disadvantageous effect of a change in the surface temperature of the liquid crystal display panel due to an environmental temperature, a circuit is arranged, the circuit being configured to detect the surface temperature of the liquid crystal display panel and adjust the transmittance-gradation characteristics in response to temperature in such a manner that the transmittance-gradation characteristics are matched to the transmittance-gradation characteristics at 25° C. (normal temperature), thereby circumventing the degradation of display performance.

However, according to such a technique, a temperature-detecting circuit and a circuit configured to adjust the transmittance-gradation characteristics in response to temperature are required, causing an increase in cost.

Furthermore, as described above, also in the case where the surface temperature of the liquid crystal display panel is locally changed by the effects of the arrangement of the light source, i.e., the backlight, and the control of the light source in addition to the effect of the environmental temperature, there are the same problems as those of the case of the change in environmental temperature. Specifically, there are a region greatly affected by heat from the backlight and a region not greatly affected by heat from the backlight, depending on the arrangement of the backlight, portions located directly or indirectly below the backlight, the distance from the light source, and so forth. Thus, the surface temperature distribution of the liquid crystal display panel is nonuniform, i.e., the liquid crystal display panel has different surface temperatures. In such a case, according to the related art, there is no effective technique for eliminating the local change in the surface temperature of the liquid crystal display panel and the effect of the surface temperature distribution.

Accordingly, in order to suppress the effect of the environmental temperature of use and the effects of heat from the backlight and an additional circuit and to maintain display quality, it is necessary to devise a system including a mechanism of the liquid crystal display device without the need for the foregoing temperature-detecting circuit and the circuit configured to adjust the transmittance-gradation characteristics in response to temperature in such a manner that the display performance related to the transmittance-gradation characteristics is not significantly changed by the change in surface temperature.

The present invention has been accomplished in light of the foregoing circumstances. It is an object of the present invention to provide a liquid crystal display panel that suppresses the temperature dependence of transmittance-gradation characteristics and thus overcomes problems in which significant changes in transmittance-gradation characteristics are caused by the effects of environmental temperature and a light source to lead to the degradation of display performance, and a liquid crystal display device including the liquid crystal display panel.

It is another object of the present invention to provide a liquid crystal display device that eliminates a surface temperature-detecting circuit and a circuit configured to adjust the transmittance-gradation characteristics in response to temperature to achieve a reduction in the cost of the liquid crystal display device.

Solution to Problem

The inventors have conducted extensive studies on the temperature dependence of display performance of a liquid crystal display panel operating in a vertical alignment mode that provides excellent display quality. The inventors have focused on the fact that transmittance-gradation characteristics are commonly adjusted at 25° C. (normal temperature), and thus when the temperature at the time of the adjustment is not matched to the surface temperature of the liquid crystal display panel, the transmittance-gradation characteristics shift. The inventors have found that the difference ($\Delta\gamma$) in coefficients $\gamma$ of the transmittance-gradation characteristics between temperatures is appropriately used to indicate the shift of a transmittance-gradation characteristic curve and found that in the case where $\Delta\gamma$ between 25° C. and 50° C., which are within the operating temperature range of a common liquid crystal display panel, is used as an index and where the value of $\Delta\gamma$ falls within a specific range, the shift of the transmittance-gradation characteristics can be suppressed owing to sufficiently low temperature dependence of the display performance of the panel to the extent that the display characteristics appear to be unchanged even if the temperature of the display panel is changed. In other words, the inventors have found that the numerical range of the difference $\Delta\gamma$ in the coefficients $\gamma$ of the transmittance-gradation characteristics between the temperatures has technically critical significance.

The inventors have also found that such $\Delta\gamma$ is achieved by the use of a liquid crystal medium which has a specific composition and a negative dielectric constant anisotropy of the and which constitutes a liquid crystal layer that operates in a vertical alignment mode without employing an approach to the arrangement of costly circuits (a surface temperature-detecting circuit and a circuit configured to adjust the transmittance-gradation characteristics in response to temperature). The inventors have conceived that the findings bring about the solution the foregoing problems. The findings have led to the completion of the present invention.

A liquid crystal display panel and a liquid crystal display device according to the present invention suppress the effect of the environmental temperature of use on display performance and thus are usable at various environmental temperatures and for various applications. Furthermore, the present invention is suitably applicable to an embodiment in which a unit, such as a light source, and a circuit that generate heat are included and thus the panel temperature can be changed by the heat, in addition to a change in environmental temperature. For example, the present invention is suitably applicable to a transmissive-mode liquid crystal display device which includes a light source and which is affected by heat from the light source.

In particular, the inventors have found that in the case where the present invention is applied to an embodiment in which a temperature distribution occurs on a surface of a liquid crystal display panel, for example, an embodiment in which the arrangement of a light source is nonuniform or an embodiment in which the luminance of a light source is variable, for example, a liquid crystal display device including a light source subjected to area control, what is called local dimming, it is possible to sufficiently suppress the effect of a temperature distribution on a panel surface on display performance, thereby providing notably excellent display performance in the application to such liquid crystal display panels.

According to the present invention, a liquid crystal display panel includes a liquid crystal medium containing a plurality of liquid crystal compounds each having a negative dielectric constant anisotropy, the liquid crystal medium being held between a first substrate and a second substrate that are located opposite each other, and a side of each of the substrates in contact with the liquid crystal medium having vertical alignment properties for the liquid crystal compounds, in which the liquid crystal medium in the liquid crystal display panel contains a liquid crystal composition (1) or a liquid crystal composition (2) having a composition described below, the liquid crystal composition (1) or the liquid crystal composition (2) containing a plurality of liquid crystal compounds selected from the group consisting of compounds represented by general formulae (I-A) to (I-J):

[Chem. 1]

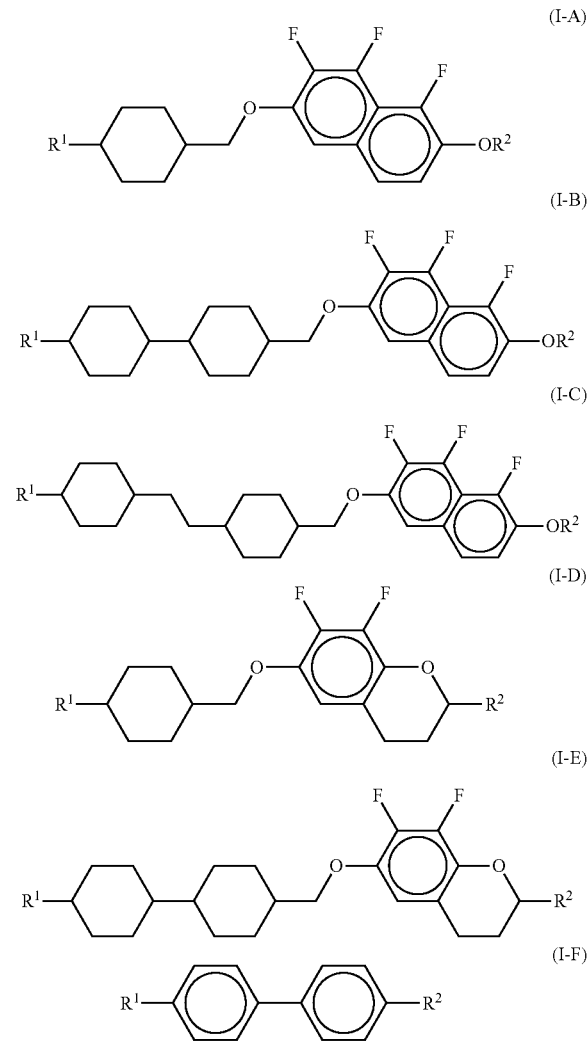

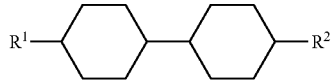

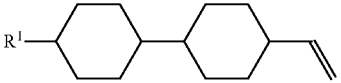

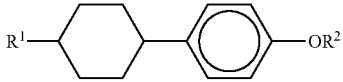

(in the general formulae, $R^1$ and $R^2$ are the same or different and each represent an alkyl group having 1 to 10 carbon atoms), in which letting the total of the plural liquid crystal compounds in the liquid crystal composition be 100% by mass, the liquid crystal composition (1) contains two or more types of each of the compounds represented by general formulae (I-A), (I-B), and (I-C), the total content thereof being 20% to 25% by mass;

two or more types of each of the compounds represented by general formulae (I-D) and (I-E), the total content thereof being 10% to 15% by mass;

one or two or more types of each of the compounds represented by general formulae (I-F) and (I-J), the total content thereof being 25% to 30% by mass; and one or two or more types of each of the compounds represented by general formulae (I-G) and (I-I), the total content thereof being 35% to 40% by mass, the liquid crystal composition (2) contains two or more types of each of the compounds represented by general formulae (I-A), (I-B), and (I-C), the total content thereof being 20% to 25% by mass;

two or more types of each of the compounds represented by general formulae (I-D) and (I-E), the total content thereof being 10% to 15% by mass;

one or two or more types of each of the compounds represented by general formulae (I-F) and (I-J), the total content thereof being 25% to 30% by mass; and one or two or more types of each of the compounds represented by general formulae (I-G) and (I-H), the total content thereof being 35% to 40% by mass, and wherein in the liquid crystal display panel, $\Delta\gamma$ which pertains to a transmittance-gradation characteristic curve coefficient and which is calculated from expressions (1) and (2) described below is 0.2 or less,

[Math. 1]

$$\text{Transmittance}[T] = (Tw - Tb) \times \left[\frac{\text{gradation}}{255}\right]^{\gamma} + Tb \quad (1)$$

$$\Delta\gamma = |\gamma_{25°\,C.} - \gamma_{50°\,C.}| \quad (2)$$

wherein in the expressions, Tb represents a transmittance at a gradation level of zero, Tw represents a transmittance at a gradation level of 255, $\gamma_{25°\,C.}$ represents the coefficient $\gamma$ at 25° C. in expression (1) and is 2.2, and $\gamma_{50°\,C.}$ represents the $\gamma$ in expression (1) at 50° C. and is calculated in such a manner that a transmittance-gradation characteristic curve at 50° C. is most closely approximated to be a transmittance-gradation characteristic curve at 25° C.

The present invention also provides a transmissive-mode liquid crystal display device including the liquid crystal display panel described above, in which the liquid crystal display device includes a light source.

As described above, the present invention provides the liquid crystal display panel and the liquid crystal display device including the liquid crystal display panel, in which on the premise that the liquid crystal display panel has vertical alignment properties for the liquid crystal compounds, i.e., the liquid crystal display panel operates in a vertical alignment mode, the liquid crystal display panel has characteristics in which $\Delta\gamma$ is in a specific numerical range, and the liquid crystal medium having a specific composition is used to achieve the characteristics.

In the following detailed description of the present invention, we will first explain that $\Delta\gamma$, which is main characteristics of the present invention, pertaining to the transmittance-gradation characteristic curve coefficient is in a specific numerical range, the liquid crystal medium, which is a main component of the present invention, has a specific composition, and so forth. Then a liquid crystal display panel and a liquid crystal display device according to preferred embodiments of the present invention will be described in detail.

$\Delta\gamma$ pertaining to the transmittance-gradation characteristic curve coefficient according to the present invention is defined as the absolute value of the difference between the coefficient $\gamma$ ($\gamma_{25°\,C.}$) of the transmittance-gradation characteristics at 25° C. and the coefficient $\gamma$ ($\gamma_{50°\,C.}$) of the transmittance-gradation characteristics at 50° C. The transmittance-gradation characteristics used here are calculated from transmittance-voltage characteristics.

The transmittance-voltage characteristics indicate a change in transmittance when a voltage is applied to a liquid crystal display panel. In the case of a normally black (NB) display, in which the transmittance is minimized when a voltage is not applied to the liquid crystal display panel, typical transmittance-voltage characteristics are illustrated in FIG. 11.

In FIG. 11, Tb represents a transmittance at a voltage ($V_0$) corresponding to a gradation level of zero in the transmittance-gradation characteristics, and Tw represents a transmittance at a voltage ($V_{255}$) corresponding to a gradation level of 255 in the transmittance-gradation characteristics.

The transmittance-gradation characteristics are obtained by converting voltages applied to the liquid crystal display panel into gradation levels on the basis of the transmittance-voltage characteristics and substituting the gradation levels and transmittance values corresponding to the gradation levels into expression (1).

[Math. 2]

$$\text{Transmittance}[T] = (Tw - Tb) \times \left[\frac{\text{gradation}}{255}\right]^\gamma + Tb \qquad (1)$$

wherein in the expression, Tb represents a transmittance at a gradation level of zero ($V_0$), and Tw represents a transmittance at a gradation level of 255 ($V_{255}$). In this case, the coefficient $\gamma$ is 2.2. In this display device, usually, the coefficient $\gamma$ in expression (1) is set to 2.2 to indicate the transmittance-gradation characteristics. In the case of a normally black (NB) display, typical transmittance-gradation characteristics are illustrated in FIG. 12.

In the present invention, $\Delta\gamma$ may be calculated through steps (1) to (4) on the basis of the transmittance-voltage characteristics and the transmittance-gradation characteristics.

(1) In the liquid crystal display panel, the relationship between the transmittance and the voltage applied to the liquid crystal display panel at 25° C. is measured as the transmittance-voltage characteristics. With respect to measurement conditions, voltages are applied between a pixel electrode and a common electrode of the liquid crystal display panel. Here, a change in transmittance may be measured with a photodiode array (PDA), a photomultiplier (abbreviated as a "photomul"), or the like. The voltages applied to the liquid crystal display panel are converted into gradation levels to lead to the relationship between the transmittance and the gradation level from expression (1) described above. The resulting relationship is defined as a normalized transmittance-gradation characteristic curve obtained by measuring and normalizing the transmittance-voltage characteristics at 25° C. The coefficient $\gamma$ in expression (1) at 25° C. is defined as $\gamma_{25°\,C.}$ and is set to 2.2. Accordingly, the gradation level is calculated from the transmittance. The relationship between the voltage and the gradation level is also calculated.

(2) In the liquid crystal display panel, as with expression (1) described above, the relationship between the transmittance and the voltage applied to the liquid crystal display panel at 50° C. is measured as the transmittance-voltage characteristics. Voltages applied to the liquid crystal display panel are converted into gradation levels to lead to the relationship between the transmittance and the gradation level from expression (1). The resulting relationship is defined as a transmittance-gradation characteristic curve obtained by measuring and normalizing the transmittance-voltage characteristics at 50° C. When the voltages are converted into the gradation levels, the relationship between the voltage and the gradation level calculated from expression (1) is applied as it is. Thus, the coefficient $\gamma$ in expression (1) at 50° C. is calculated.

(3) The coefficient $\gamma$ at 50° C. is changed in such a manner that the transmittance-gradation characteristic curve obtained by actually measuring and normalizing the transmittance-voltage characteristics at 50° C. is matched to the transmittance-gradation characteristic curve obtained by measuring and normalizing the transmittance-voltage characteristics at 25° C. In other words, the coefficient $\gamma$ in expression (1) at 50° C. is calculated and determined in such a manner that the transmittance-gradation characteristic curve at 50° C. is most closely approximated to be the transmittance-gradation characteristic curve at 25° C. Here, the coefficient $\gamma$ is defined as $\gamma_{50°\,C.}$. The coefficient $\gamma$ can be determined with commercially available spreadsheet software. In particular, it is preferable to determine the value of $\gamma$ such that the transmittance at 50° C. and at low gradation levels is closely matched to the transmittance at 25° C. and at low gradation levels using expression (1).

(4) The absolute value $\Delta\gamma$ of the difference between $\gamma_{25°\,C.}$ (=2.2) and $\gamma_{50°\,C.}$ is calculated from expression (2) and defined as $\Delta\gamma$ pertaining to the transmittance-gradation characteristic curve coefficient.

The value of $\Delta\gamma$ of the liquid crystal display panel according to the present invention is 0.2 or less. Thus, even if the surface temperature of the liquid crystal display panel is not equal to a temperature at the time of the adjustment of the transmittance-gradation characteristics, the shift of the transmittance-gradation characteristics is suppressed. This leads to the elimination of the need to mount a surface temperature-detecting circuit of the liquid crystal display device and a circuit configured to adjust the transmittance-gradation characteristics in response to temperature, which are mounted on a liquid crystal display device in the related art, thereby resulting in advantages in cost and so forth. Even if such a circuit is arranged, the liquid crystal display panel itself suppresses the shift of the transmittance-gradation characteristics, thereby successfully maintaining display quality against temperature changes.

The reason the value of $\Delta\gamma$ is set to 0.2 or less will be described in detail in embodiments. The outline of the reason is described below. The shift of the transmittance-gradation characteristic curve with temperature causes a difference in luminance at different temperatures despite the application of the same gradation voltage, leading to a reduction in display quality. In a low gradation level region where the transmittance is low, in particular, the difference of the number of gradation levels noticeably affects the display quality because of a small number of gradation levels. For example, in the case of a normally black (NB) display, the difference in luminance between gradation levels in the low gradation level region is easily recognized, thus resulting in a more noticeable degradation of the display performance due to a smaller number of the gradation levels. Usually, the value of the transmittance-gradation characteristic curve coefficient $\gamma$ varies depending on the surface temperature of a liquid crystal display panel. A higher surface temperature causes the value of $\gamma$ to shift to a lower value, so that the transmittance-gradation characteristic curve also shifts to low gradation levels. In the present invention, the value of $\gamma$ at a surface temperature of the liquid crystal display panel of 25° C. is 2.2. The absolute value $\Delta\gamma$ of the difference between the value of $\gamma$ at a surface temperature of the liquid crystal display panel of 25° C. and the value of $\gamma$ at 50° C. is 0.2 or less. Thus, the value of $\gamma$ at 50° C. is preferably in the range of 2.0 to 2.2. For example, if the value of $\gamma$ at 50° C. is 2.0, the value is within the technical scope of the present invention. If the value of $\gamma$ at 50° C. is 1.9, the value is outside the scope of the present invention. In the cases where the value of $\gamma$ is 2.0 ($\Delta\gamma=0.2$), which is a boundary value in the numerical range of the present invention, and where the value of $\gamma$ is 1.9 ($\Delta\gamma=0.3$), which is a value outside the numerical range of the present invention, the gradation levels in the low gradation level region (for example, a gradation level region where the transmittance is about 0.01%) of the transmittance-gradation characteristic curve are compared. As will be described in detail in embodiments below, when $\gamma=2.0$ ($\Delta\gamma=0.2$), there is no significant change in gradation level or the degradation of the display performance, compared with when $\gamma=2.2$. In contrast, when $\gamma=1.9$ ($\Delta\gamma=0.3$), a change in gradation level causes the degradation of the display performance to be recognized, compared with when $\gamma=2.2$. In the embodiments, in a transmittance-gradation characteristic curve at 25° C., $\gamma=2.2$, $\gamma=2.0$ ($\Delta\gamma=0.2$), and $\gamma=1.9$ ($\Delta\gamma=0.3$), and a gradation level of 32, which corresponds to a transmittance of about 0.01%, is defined as the reference of the low gradation level region. In the transmittance-gradation characteristic curve, when Tb, which represents a transmittance at a gradation level of zero ($V_0$), Tw, which represents a transmittance at a gradation level of 255 ($V_{255}$), and $\gamma$ are determined, the transmittance-gradation characteristic curve is determined. Usually, the values of Tb are substantially the same as those of Tw at 25° C. and 50° C. Thus, the results from comparisons of the transmittance-gradation characteristic curves at 25° C. when $\gamma=2.2$, $\gamma=2.0$, and $\gamma=1.9$ are comparable to the results from comparisons of the transmittance-gradation characteristic curve at 25° C. when $\gamma=2.2$ with the transmittance-gradation characteristic curves at 50° C. when $\gamma=2.0$ and $\gamma=1.9$.

The value of $\Delta\gamma$ is preferably 0.17 or less and more preferably 0.15 or less as described in the embodiments.

The liquid crystal display panel according to the present invention includes a liquid crystal medium containing a plurality of liquid crystal compounds each having a negative dielectric constant anisotropy, the liquid crystal medium being held between a first substrate and a second substrate that are located opposite each other. That is, the liquid crystal medium constituting what is called a liquid crystal layer in the liquid crystal display panel containing a composition that contains the plural liquid crystal compounds each having a negative dielectric constant anisotropy is used. "Having a negative dielectric constant anisotropy" indicates that in a molecular structure of a liquid crystal compound having a long axis and a short axis, the dielectric constant in the direction of the long axis is higher than that in the direction of the short axis. The reason for the use of the negative dielectric constant anisotropy is that the liquid crystal display panel according to the present invention operates in what is called a vertical alignment mode. The reason the liquid crystal layer is composed of the plural liquid crystal compounds is that it is suitable for the vertical alignment mode and that in order to achieve the value of $\Delta\gamma$, optimization is implemented by the combination of various liquid crystal compounds.

In the present invention, the liquid crystal composition (1) or (2) is adopted as the liquid crystal medium in the liquid crystal display panel. It is thus possible to provide the liquid crystal display panel in which $\Delta\gamma$ pertaining to the transmittance-gradation characteristic curve coefficient is 0.2 or less. This suppresses the shift of the transmittance-gradation characteristics even if the surface temperature of the liquid crystal display panel during operation is not matched to a surface temperature at the time of the adjustment of the transmittance-gradation characteristics, thereby resulting in a satisfactory surface temperature dependence of the display performance of the liquid crystal display panel.

The liquid crystal medium in the liquid crystal display panel is composed of the liquid crystal composition (1) or liquid crystal composition (2). The liquid crystal composition is composed of a plurality of liquid crystal compounds selected from the group consisting of compounds represented by general formulae (I-A) to (I-J) (in the general formulae, $R^1$ and $R^2$ are the same or different and each represent an alkyl group having 1 to 10 carbon atoms). In the present invention, it is found that the composition of the liquid crystal medium in the liquid crystal display panel significantly affects the temperature dependence of the display performance. The embodiments described below demonstrate that the liquid crystal composition (1) or liquid crystal composition (2) brings about the outstanding temperature dependence of the display performance.

With respect to a method for preparing the liquid crystal composition, liquid crystal compounds may be prepared and formed into the following composition, as described in the prior art documents described above.

With respect to the composition of the liquid crystal composition, letting the total of the plural liquid crystal compounds in the liquid crystal composition be 100% by mass, the liquid crystal composition (1) satisfies items (1-1) to (1-4):

(1-1) two or more types of each of the compounds represented by general formulae (I-A), (I-B), and (I-C) are contained, the total content of the compounds represented by general formulae (I-A), (I-B), and (I-C) being 20% to 25% by mass, (1-2) two or more types of each of the compounds represented by general formulae (I-D) and (I-E) are contained, the total content of the total content of the compounds represented by general formulae (I-D) and (I-E) being 10% to 15% by mass, (1-3) one or two or more types of each of the compounds represented by general formulae (I-F) and (I-J) are contained, the total content of the compounds represented by general formulae (I-F) and (I-J) being 25% to 30% by mass, and (1-4) one or two or more types of each of the compounds represented by general formulae (I-G) and (I-I) are contained, the total content of the compounds represented by general formulae (I-G) and (I-I) being 35% to 40% by mass.

The liquid crystal composition (2) satisfies items (2-1) to (2-4):

(2-1) two or more types of each of the compounds represented by general formulae (I-A), (I-B), and (I-C) are contained, the total content of the compounds represented by general formulae (I-A), (I-B), and (I-C) being 20% to 25% by mass, (2-2) two or more types of each of the compounds represented by general formulae (I-D) and (I-E) are contained, the total content of the compounds represented by general formulae (I-D) and (I-E) being 10% to 15% by mass, (2-3) one or two or more types of each of the compounds represented by general formulae (I-F) and (I-J) are contained, the total content of the compounds represented by general formulae (I-F) and (I-J) being 25% to 30% by mass, and (2-4) one or two or more types of each of the compounds represented by general formulae (I-G) and (I-H) are contained, the total content of the compounds represented by general formulae (I-G) and (I-H) being 35% to 40% by mass.

In the liquid crystal display panel according to the present invention, a side of each of the substrates in contact with the liquid crystal medium has vertical alignment properties for the liquid crystal compounds. A commonly used vertical alignment mode may be used. An example thereof is a structure in which an electrode, an insulating film, an alignment layer (an organic, inorganic, or photo-alignment layer may be used), and so forth are arranged on a substrate and the alignment layer arranged so as to be in contact with the liquid crystal medium is processed in such a manner that the liquid crystal compounds are allowed to be aligned perpendicular to the substrate. With respect to the vertical alignment mode, a structure is preferably used in which liquid crystal molecules are aligned in a direction perpendicular to a surface of the substrate when no voltage is applied. Such a vertical alignment mode is a display mode in which usually, a negative-type liquid crystal having a negative dielectric constant anisotropy is used, liquid crystal molecules are aligned in a direction substantially perpendicular to a surface of a substrate when a voltage less than a threshold voltage is applied (for example, when no voltage is applied), and the liquid crystal molecules are tilted in a direction substantially parallel to the surface of the substrate when a voltage equal to or higher than the threshold voltage. This mode provides a high contrast ratio.

The liquid crystal molecules may be aligned substantially perpendicular to the substrate surface to the extent that it is commonly evaluated as a vertical alignment mode in this technical field as long as it is within the scope of the vertical alignment mode technology in liquid crystal display panels. For example, the technical scope of the present invention includes a structure in which a liquid crystal compound is slightly tilted to the substrate, i.e., the liquid crystal compound has what is called a pre-tilt angle.

Preferred embodiments of the liquid crystal display panel and the liquid crystal display device according to the present invention will be described below.

In the liquid crystal display panel according to the present invention, the operating temperature range of the liquid crystal display panel preferably includes 0° C. to 50° C. While the use of the liquid crystal display panel in a temperature range above or below the foregoing temperature range is not prevented, the operating temperature range is preferably set to the foregoing range in order to sufficiently provide the advantageous effects of the present invention.

The operating temperature range can be restated as follows: the operating temperature range includes a range of 25° C.±25° C. centered at 25° C. in connection with the setting of the value of $\gamma$ to the foregoing value when the surface temperature of the liquid crystal display panel is 25° C. As described above, in the transmittance-gradation characteristic curve, the absolute value $\Delta\gamma$ of the difference between the value of $\gamma$ when the surface temperature of the liquid crystal display panel is 25° C. and the value of $\gamma$ when the surface temperature of the liquid crystal display panel is 50° C. is 0.2 or less. Thus, with respect to the operating temperature of the liquid crystal display panel, the effects of the present invention are provided at least in the range of 25° C., which is normal temperature, to 50° C., which is a value of 25° C.+25° C. Similarly, at temperatures below 25° C., the effects of the present invention are provided in the range of 25° C. to 0° C., which is a value of 25° C.-25° C. In a low temperature range of 0° C. to 25° C., a change in the value of $\gamma$ is small, compared with a high temperature range of 25° C. to 50° C.

In the present invention, with respect to the operating temperature of the liquid crystal display panel, in the case where a certain temperature difference with time and/or in a surface region of the panel occurs, the advantageous effect of the present invention in which the temperature dependence of the display performance is sufficiently suppressed can be provided. That is, in the cases where the operating temperature of the liquid crystal display panel varies with time because of, for example, a change in the environmental temperature of use and where the luminance of a backlight is adjusted in response to the quantity of external light, a temperature distribution is caused in the surface region of the panel, as described below. The present invention is preferably applied when the operating temperature of the liquid crystal display panel varies in the surface region of the panel. In other words, there are the temperature difference between the minimum temperature and the maximum temperature due to a change in the temperature of the entire panel surface, and the temperature difference between a minimum temperature region and a maximum temperature region when a temperature distribution occurs in the surface region of the panel. The present invention is preferably applied when the temperature difference is large to the extent that a surface temperature-detecting circuit and a circuit configured to adjust the transmittance-gradation characteristics in the related art are required. For example, the present invention is preferably applied to an embodiment in which the temperature difference is 10° C. or more and more preferably 15° C. or more. Thus, an embodiment of the liquid crystal display panel according to the present invention is an embodiment in which the operating temperature range includes 0° C. to 50° C. and the foregoing temperature difference occurs in the panel surface.

In the liquid crystal composition in the liquid crystal display panel according to the present invention, preferably, the transition temperature between a nematic phase and an isotropic liquid phase is in the range of 73° C. to 82° C., the transition temperature between a smectic phase or a glass phase and a nematic phase is in the range of −50° C. to −30° C., the refractive index anisotropy at 25° C. is in the range of 0.090 to 0.094, and the dielectric constant anisotropy at 25° C. is in the range of −3.1 to −2.5. The product of the refractive index anisotropy and the cell gap of the liquid crystal display panel may be a value that substantially satisfies the λ/2-plate condition.

Commonly, a liquid crystal medium is required to set the foregoing characteristic values suitable for the mode of a liquid crystal element and so forth. In the present invention, in addition thereto, the characteristic values are set in such a manner that the foregoing value of Δγ is achieved. The transition temperature (Tni) between the nematic phase and the isotropic liquid phase and the transition temperature (Tsn) between the smectic phase or the glass phase and the nematic phase indicate the upper limit temperature and the lower limit temperature, respectively, at which a liquid crystal medium can be present as a nematic phase, which is a liquid crystal phase. They are used as indices of the chemical and physical stability, optical properties, and electrical properties of the liquid crystal medium, in addition to the refractive index anisotropy (Δn) at 25° C. and the dielectric constant anisotropy (Δ∈) at 25° C. With respect to methods for measuring and calculating the foregoing characteristic values, methods commonly employed in technical field of liquid crystals may be employed.

When these characteristic values are outside the foregoing numerical ranges, the display performance required for the liquid crystal display panel may not be achieved, the liquid crystal medium may not be suitable for the vertical alignment mode, and the foregoing value of Δγ may not be achieved. To satisfy these characteristics, it is necessary to select some liquid crystal compounds having various characteristics and study an optimal composition. In the present invention, the adoption of the liquid crystal composition (1) or (2) enables the characteristic values to be within the foregoing range, thereby resulting in excellent display performance and applicability to the vertical alignment mode. Furthermore, the foregoing value of Δγ is achieved to sufficiently suppress the temperature dependence of the display performance.

The present invention provides a transmissive-mode liquid crystal display device including the liquid crystal display panel described above, in which the liquid crystal display device includes a light source.

The liquid crystal display panel according to the present invention is included in a liquid crystal display device. As described above, it is possible to suppress the temperature dependence of the display performance without the need for a conventional surface temperature-detecting circuit or circuit configured to adjust the transmittance-gradation characteristics. With respect to the liquid crystal display device, the present invention is suitably applicable to an embodiment in which the effect of the environmental temperature of use on the display performance is suppressed and the liquid crystal display device includes a unit, such as a light source, and a circuit, which generate heat that can change the panel temperature. Examples of such an embodiment include a transmissive-mode liquid crystal display device having a structure in which a light source is arranged and light from the light source is incident on the liquid crystal display panel and then transmitted therethrough. The present invention is suitably applicable to the liquid crystal display device.

In the liquid crystal display panel and the liquid crystal display device according to the present invention, other structures other than the structures described in the present specification may be designed by methods commonly used in this technical field and are preferably designed so as to provide the advantageous effects owing to the technical features of the present invention.

In the liquid crystal display device, preferably, the arrangement of the light source is nonuniform for the liquid crystal display panel, or the luminance of the light source is variable.

The present invention is suitably applicable to an embodiment in which the panel temperature can be changed by heat from the light source and so forth. Examples of such an embodiment include (1) an embodiment in which a temperature distribution occurs on the panel surface; and (2) embodiments in which the temperature of the panel surface varies in response to the luminance of the light source and the operating time, in other words, embodiments in which the luminance of the light source is changed in response to the luminance of the outside and in which the temperature of the panel surface immediately after turning on a power source differs from that after the passage of time. In the embodiment (1) in which the temperature distribution occurs on the panel surface, it is necessary to adjust the transmittance-gradation characteristics for each region of the panel surface. It is thus impossible to adjust the transmittance-gradation characteristics by a surface temperature-detecting circuit and a circuit configured to adjust the transmittance-gradation characteristics in the related art, the circuits being configured to adjust the display characteristics of the all regions of the panel surface. That is, the display characteristics in the embodiment (1) are first improved by the present invention.

The configuration of the light source of the liquid crystal display device is categorized into a structure in which the arrangement of the light source is nonuniform for the liquid crystal display panel and a structure in which the arrangement of the light source is uniform. The structures are categorized by the arrangement of the light source. In other words, they could also be considered as structures in which the light source is arranged partly or entirely for the liquid crystal display panel. Typically, the structure in which the arrangement of the light source is nonuniform is referred to as an edge-lighting system in which a backlight is arranged on a side of the liquid crystal display panel. The structure in which the arrangement of the light source is uniform is referred to as a direct-lighting system in which a backlight is arranged below the liquid crystal display panel (opposite side of a display surface).

The structure in which the arrangement of the light source is nonuniform is preferably a structure in which the liquid crystal display panel is irradiated with light with a light guide (plate), the light being emitted from the light source unevenly (partly) arranged for the liquid crystal display panel. This is also referred to as a "light guide plate system". As described above, when the arrangement of the light source is nonuniform, the temperature distribution of the liquid crystal display panel occurs in response to the difference of the distance from the light source. Thus, this structure has a problem of the temperature dependence of the display performance. Hence, the application of the present invention to the structure is technically significant.

In the case of the structure in which the arrangement of the light source is uniform, the fact that the luminance of the light source is preferably variable is suitable for the application of the present invention. For example, a structure is preferred in which the liquid crystal display panel is irradiated with light from the light source arranged uniformly (entirely) for the liquid crystal display panel, the light being controlled in each of a plurality of regions. This is also referred to as a local dimming method. As described above, in the case where the luminance of the light source is variable in the plural regions, a relatively high-luminance, high-temperature region near the light source and a relatively low-luminance, low-temperature region near the light source cause the temperature distribution of the liquid crystal display panel. This structure also has a problem of the temperature dependence of the display performance. Thus, the application of the present invention to the structure is technically significant.

Regardless of whether the arrangement of the light source is nonuniform or uniform, the arrangement of a circuit, such as an inverter circuit, configured to turn on the light source, such as a cold cathode fluorescent lamp (CCFL) also causes the temperature distribution of the liquid crystal display panel. This structure also has a problem of the temperature dependence of the display performance. Thus, the application of the present invention to the structure is technically significant.

The arrangement and control of the light source cause a panel surface temperature distribution. For example, a panel surface temperature distribution may occur in the range of 0° C. to 50° C. As described above, the present invention is preferably applied to an embodiment in which the difference in temperature between the minimum temperature region and the maximum temperature region in the panel surface temperature distribution is 10° C. or more. More preferably, the present invention is applied to an embodiment in which the difference in temperature is 15° C. or more. Also in the case where the panel surface temperature distribution results in the difference ($\Delta\gamma$) in $\gamma$ pertaining to the transmittance-gradation characteristics between the regions of the panel surface, $\Delta\gamma$ is set within the foregoing numerical range, thereby sufficiently suppressing the effect on the display performance. In the case where the liquid crystal composition (1) or (2) is used as the liquid crystal medium, $\Delta\gamma$ can be set within the foregoing numerical range. This sufficiently suppresses the temperature dependence of the display performance due to the arrangement and control of the light source used in the liquid crystal display panel, thereby providing the outstanding display performance.

The foregoing embodiments and structures may be appropriately combined without departing from the gist of the present invention.

Advantageous Effects of Invention

According to the liquid crystal display panel and the liquid crystal display device of the present invention, a change in transmittance-gradation characteristics due to the effects of environmental temperature and the light source is reduced, thus sufficiently suppressing the degradation of the display performance.

DESCRIPTION OF EMBODIMENTS

Figure 1:
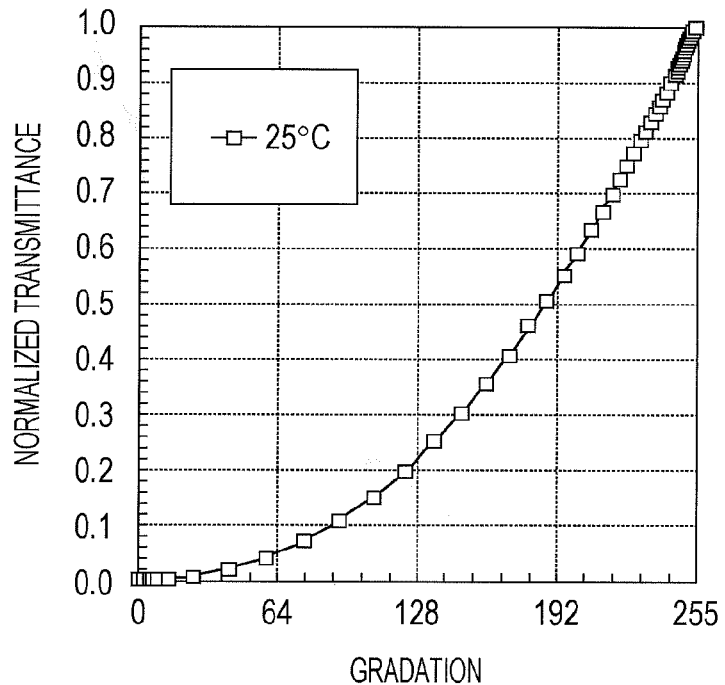
FIG. 1 is a graph illustrating the transmittance-gradation characteristics of a liquid crystal display panel according to a first embodiment at 25° C.

Embodiments will be described below, and the present invention will be described in more detail with reference to the drawings. However, the present invention is not limited to these embodiments.

Compositions of a liquid crystal composition A and a liquid crystal composition B, which are liquid crystal media used in this embodiment, are described in Table 1. Table 2 describes the transition temperature between the nematic phase and the isotropic liquid phase (Tni), the transition temperature between the smectic phase or glass phase and the nematic phase (Tsn), the refractive index anisotropy ($\Delta n$) at 25° C., and a dielectric constant anisotropy ($\Delta\epsilon$) at 25° C. as indices of the chemical and physical stability, optical properties, and electrical properties of the liquid crystal composition A and the liquid crystal composition B. With respect to methods for measuring or calculating the characteristic values, the characteristic values are measured by techniques commonly used in the technical field of liquid crystals.

TABLE 1

| Formula | Structural formula | $R^1$ | $R^2$ | Composition ratio (percent by weight) | |
| --- | --- | --- | --- | --- | --- |
| | | | | Liquid crystal composition A | Liquid crystal composition B |
| I-A | 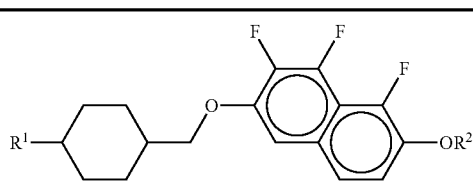 | $C_3H_7$<br>$C_5H_{11}$<br>$C_5H_{11}$ | $C_4H_9$<br>$C_2H_5$<br>$C_3H_7$ | 3<br>3<br>3 | 3<br>4<br>3 |

TABLE 1-continued

| Formula | Structural formula | $R^1$ | $R^2$ | Liquid crystal composition A | Liquid crystal composition B |
|---|---|---|---|---|---|
| I-B | R¹–[Cy]–[Cy]–CH₂–O–[C₆F₃]–[C₆H₃F]–OR² | $C_2H_5$<br>$C_3H_7$ | $C_2H_5$<br>$C_4H_9$ | 4<br>2 | 4<br>2 |
| I-C | R¹–[Cy]–CH₂–[Cy]–CH₂–O–[C₆F₃]–[C₆H₃F]–OR² | $C_3H_7$<br>$C_3H_7$ | $C_2H_5$<br>$C_3H_7$ | 4<br>4 | 4<br>2 |
| I-D | R¹–[Cy]–CH₂–O–[C₆F₂]–O–[chroman]–R² | $C_3H_7$<br>$C_5H_{11}$ | $C_5H_{11}$<br>$C_5H_{11}$ | 4<br>3 | 4<br>3 |
| I-E | R¹–[Cy]–[Cy]–CH₂–O–[C₆F₂]–O–[chroman]–R² | $C_3H_7$<br>$C_4H_9$ | $C_5H_{11}$<br>$C_5H_{11}$ | 4<br>2 | 4<br>2 |
| I-F | R¹–[Ph]–[Ph]–R² | $C_5H_{11}$ | $CH_3$ | 11 | 14 |
| I-G | R¹–[Cy]–[Cy]–R² | $C_3H_7$<br>$C_3H_7$<br>$C_3H_7$ | $C_2H_5$<br>$C_4H_9$<br>$C_5H_{11}$ | 15 | — |
| I-H | R¹–[Cy]–[Cy]–CH=CH₂ | $C_3H_7$ | — | 9 | 7 |
| I-I | R¹–[Cy]–[Ph]–OR² | $C_3H_7$ | $C_4H_9$ | 4 | — |
| I-J | R¹–[Cy]–[Cy]–[Ph]–R² | $C_2H_5$<br>$C_3H_7$<br>$C_3H_7$ | $CH_3$<br>$CH_3$<br>$C_3H_7$ | 8<br>8<br>— | —<br>7<br>6 |

TABLE 2

| Item | Unit | Measured temperature | Liquid crystal composition A | Liquid crystal composition B |
|---|---|---|---|---|
| Tni | [° C.] | — | 79.8 | 75.8 |
| Tsn | [° C.] | — | −38 | −46 |
| Δn | — | 25° C. | 0.092 | 0.092 |
| Δε | — | 25° C. | −2.9 | −2.7 |

Voltages applied to the liquid crystal display panel are converted into gradation levels on the basis of the transmittance-voltage characteristics. The gradation levels and transmittance values corresponding to the gradation levels are substituted into expression (1). The results are depicted and referred to as the transmittance-gradation characteristics in the present specification.

In this case, the coefficient $\gamma_{25°\,C.}$ in expression (1) at 25° C. is 2.2. The transmittance-voltage characteristics are measured at 25° C. A normalized transmittance-gradation characteristic curve is used as an index. The transmittance-voltage characteristics are measured at 50° C. The coefficient γ is changed in such a manner that the shape of a normalized transmittance-gradation characteristic curve at 50° C. is matched to that of the transmittance-gradation characteristic curve at 25° C., i.e., the normalized transmittance-gradation characteristic curve at 50° C. is most closely approximated to be the transmittance-gradation characteristic curve at 25° C. The coefficient here is defined as $\gamma_{50°\,C.}$. The absolute value of the difference between $\gamma_{25°\,C.}$ (2.2) and $\gamma_{50°\,C.}$ is defined as $\Delta\gamma$ (as expressed in expression (2)). In the present specification, $\Delta\gamma$ is also referred to as a transmittance-gradation characteristic curve coefficient. Specifically, $\Delta\gamma$ may be calculated by the foregoing steps (1) to (4).

[Exp. 3]

$$\text{Transmittance}[T] = (Tw - Tb) \times \left[\frac{\text{gradation}}{255}\right]^{\gamma} + Tb \quad (1)$$

$$\Delta\gamma = |\gamma_{25°\,C.} - \gamma_{50°\,C.}| \quad (2)$$

First Embodiment

Figure 2:
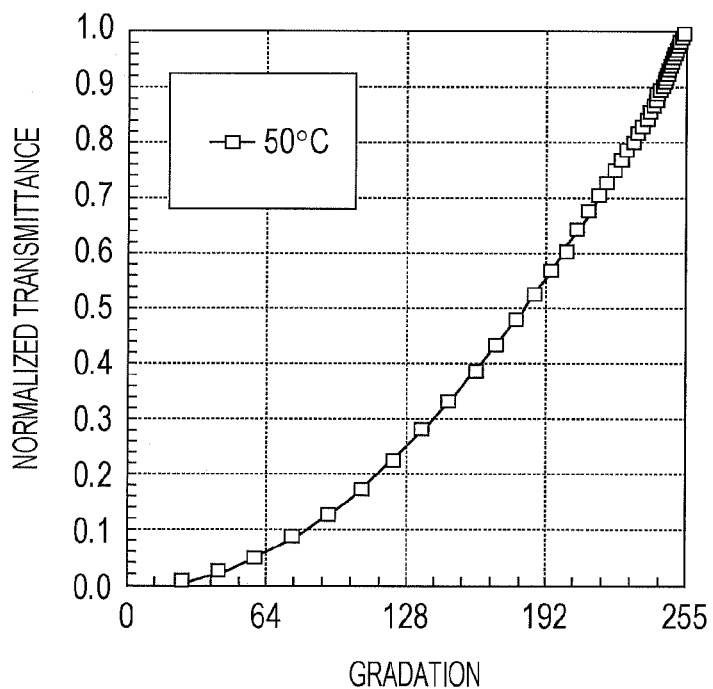
FIG. 2 is a graph illustrating the transmittance-gradation characteristics of the liquid crystal display panel according to the first embodiment at 50° C.

In a first embodiment, the liquid crystal composition A is used as a liquid crystal medium. FIG. 1 is a graph illustrating the transmittance-gradation characteristics of a liquid crystal display panel according to the first embodiment at 25° C. FIG. 2 is a graph illustrating the transmittance-gradation characteristics of the liquid crystal display panel according to the first embodiment at 50° C.

Figure 3:
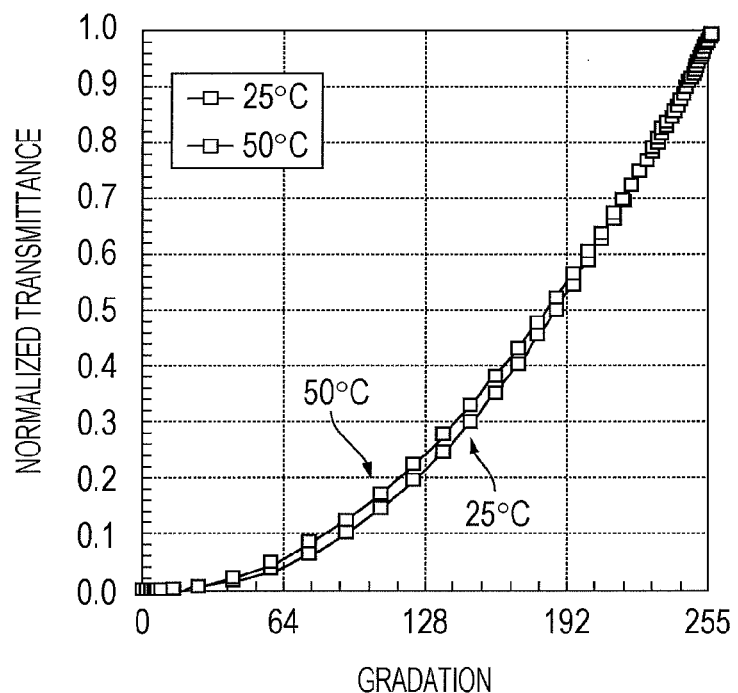
FIG. 3 is a graph illustrating the transmittance-gradation characteristics of the liquid crystal display panel according to the first embodiment at 25° C. and 50° C.

FIG. 3 is obtained by the superimposition of FIGS. 1 and 2 and is a graph illustrating the transmittance-gradation characteristics of the liquid crystal display panel according to the first embodiment at 25° C. and 50° C.

Second Embodiment

Figure 4:
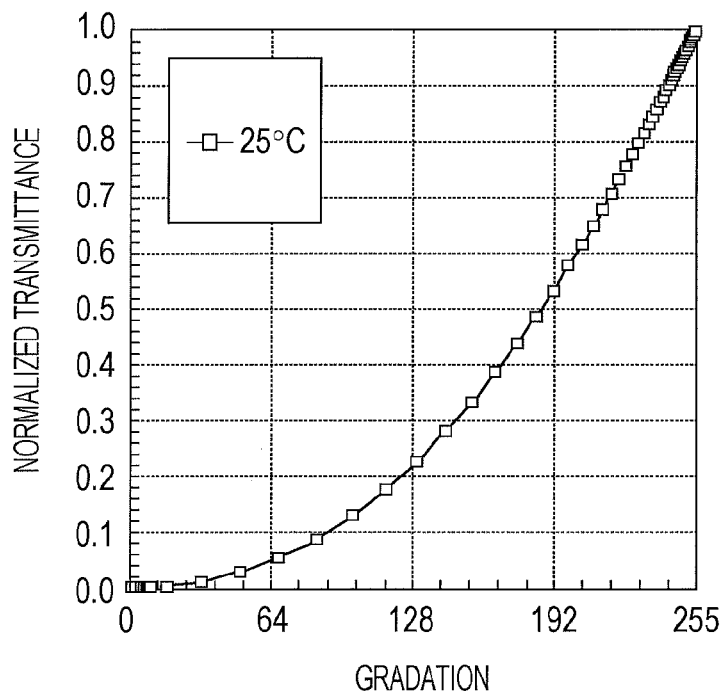
FIG. 4 is a graph illustrating the transmittance-gradation characteristics of a liquid crystal display panel according to a second embodiment at 25° C.
Figure 5:
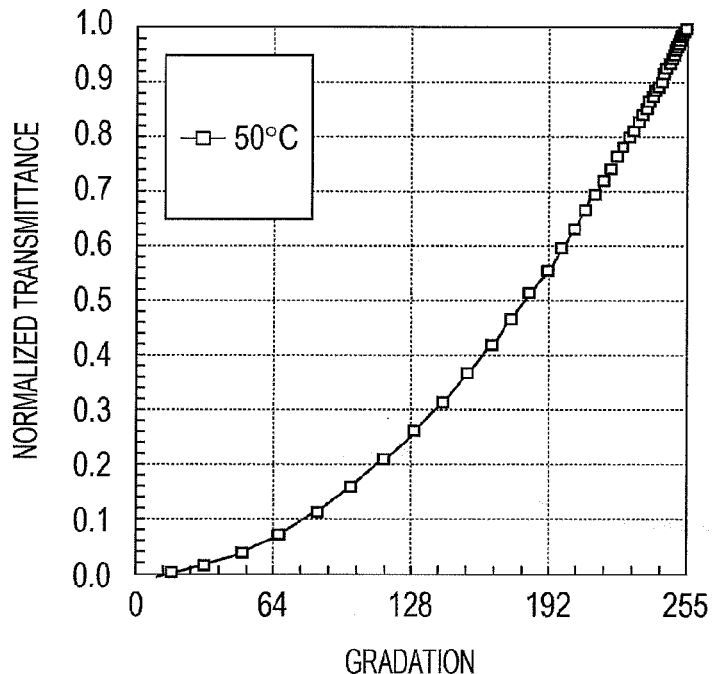
FIG. 5 is a graph illustrating the transmittance-gradation characteristics of the liquid crystal display panel according to the second embodiment at 50° C.

In a second embodiment, the liquid crystal composition B is used as a liquid crystal medium. FIG. 4 is a graph illustrating the transmittance-gradation characteristics of a liquid crystal display panel according to the second embodiment at 25° C. FIG. 5 is a graph illustrating the transmittance-gradation characteristics of the liquid crystal display panel according to the second embodiment at 50° C.

Figure 6:
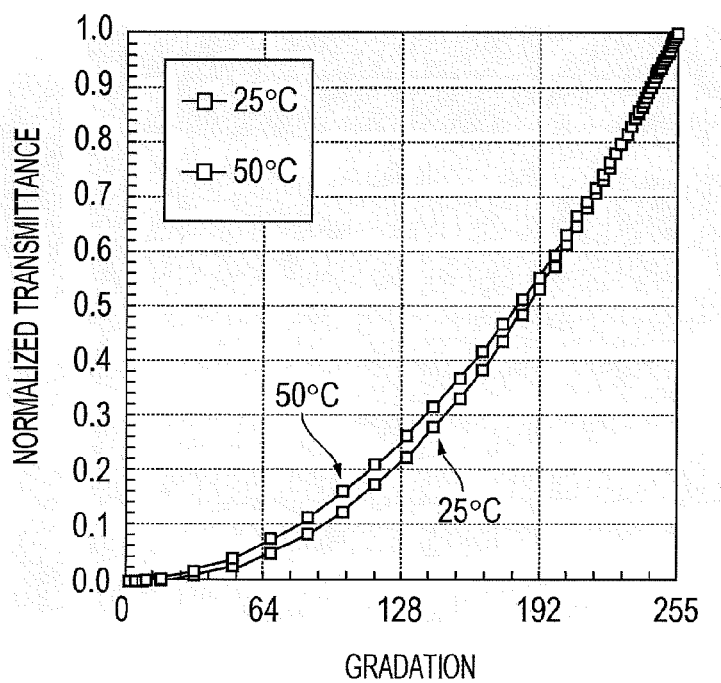
FIG. 6 is a graph illustrating the transmittance-gradation characteristics of the liquid crystal display panel according to the second embodiment at 25° C. and 50° C.

FIG. 6 is obtained by the superimposition of FIGS. 4 and 5 and is a graph illustrating the transmittance-gradation characteristics of the liquid crystal display panel according to the second embodiment at 25° C. and 50° C.

Table 3 describes $\gamma_{25°\,C.}$, $\gamma_{50°\,C.}$, and $\Delta\gamma$ of the liquid crystal composition A used in the first embodiment and the liquid crystal composition B used in the second embodiment.

TABLE 3

|  | $\gamma_{25°\,C.}$ | $\gamma_{50°\,C.}$ | $\Delta\gamma$ |
| --- | --- | --- | --- |
| Liquid crystal composition A | 2.2 | 2.05 | 0.15 |
| Liquid crystal composition B | 2.2 | 2.03 | 0.17 |

It is found that in both materials, i.e., in both liquid crystal compositions, $\Delta\gamma$ is as low as 0.2 or less and that they have excellent transmittance-gradation characteristics. The transmittance-gradation characteristics at 0° C. ($\gamma_{0°\,C.}$) of each of the liquid crystal compositions are the same as the transmittance-gradation characteristics ($\gamma_{25°\,C.}$), and $\gamma_{0°\,C.}$ is equal to 2.2.

Third Embodiment

Figure 7:
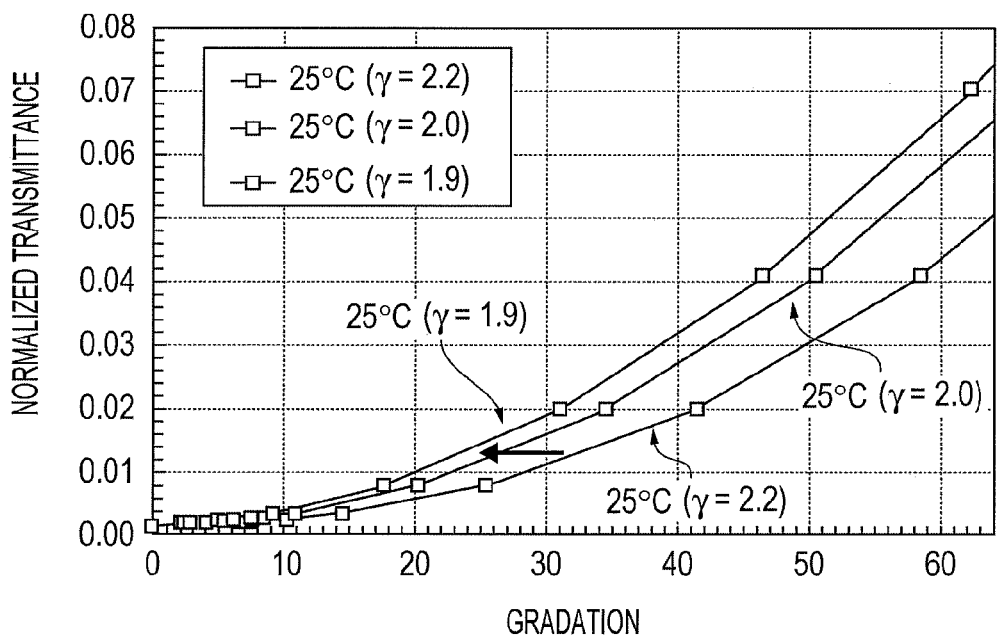
FIG. 7 is a graph illustrating transmittance-gradation characteristics when a liquid crystal composition A is contained.

FIG. 7 is a graph illustrating transmittance-gradation characteristics when a liquid crystal composition A is contained. FIG. 7 illustrates the transmittance-gradation characteristics on the low level side of gradation when the coefficients $\gamma$ ($\gamma_{25°\,C.}$) of the transmittance-gradation characteristics are 2.2, 2.0 ($\Delta\gamma$=0.2), and 1.9 ($\Delta\gamma$=0.3).

Table 4 describes the transmittance values at various gradation levels at 25° C. and 50° C. when the coefficients $\gamma$ of the transmittance-gradation characteristic curves indicating the transmittance-gradation characteristics of the liquid crystal composition A and the liquid crystal composition B are 2.2. Table 4 also describes the transmittance values at various gradation levels when the coefficients $\gamma$ of the transmittance-gradation characteristic curves indicating the transmittance-gradation characteristics of the liquid crystal composition A are 2.0 ($\Delta\gamma$=0.2) and 1.9 ($\Delta\gamma$=0.3). In Table 4, deg indicates ° C. Table 4 describes the normalized transmittance when a voltage of 7.5 V is applied to the liquid crystal display panel.

TABLE 4

| | Liquid crystal composition A Normalized transmittance at 7.5 V | | | |
| --- | --- | --- | --- | --- |
| Gradation level | 25 deg [γ: 2.2] | 50 deg [γ: 2.05] | γ: 2.00 | γ: 1.9 |
| 16 | 0.004 | — | 0.006 | 0.007 |
| 32 | 0.013 | 0.014 | 0.018 | 0.021 |
| 64 | 0.051 | 0.063 | 0.065 | 0.074 |
| 96 | 0.119 | 0.142 | 0.143 | 0.158 |
| 128 | 0.222 | 0.251 | 0.253 | 0.272 |
| 160 | 0.36 | 0.39 | 0.395 | 0.414 |
| 192 | 0.537 | 0.554 | 0.568 | 0.584 |
| 224 | 0.752 | 0.751 | 0.772 | 0.782 |
| 255 | 1 | 1 | 1 | 1 |

| | Liquid crystal composition B Normalized transmittance at 7.5 V | |
| --- | --- | --- |
| Gradation level | 25 deg [γ: 2.2] | 50 deg [γ: 2.03] |
| 16 | 0.004 | — |
| 32 | 0.012 | 0.016 |
| 64 | 0.05 | 0.066 |
| 96 | 0.119 | 0.146 |
| 128 | 0.223 | 0.254 |
| 160 | 0.36 | 0.392 |
| 192 | 0.537 | 0.556 |
| 224 | 0.752 | 0.757 |
| 255 | 1 | 1 |

As is clear from FIG. 7 and Table 4, when the coefficient $\gamma$ of the transmittance-gradation characteristic curve shifts (decreases) from 2.2, a gradation level that leads to the same transmittance shifts to the side of lower gradation levels. In particular, in the case of a normally black (NB) display, a difference in luminance between gradation levels in a low gradation region is easily recognized.

From this, when the coefficient $\gamma$ of the transmittance-gradation characteristics curve shifts (decreases) from 2.2, display performance degradation in a low gradation level region is more pronounced.

Thus, a gradation level of 32, which corresponds to a transmittance of about 0.01%, is defined as the reference of the low gradation level region. When $\gamma$ is 2.2, the transmittance is 0.013% at a gradation level of 32. When $\gamma$ is 2.0, a gradation level that leads to a transmittance equal to this value (0.013%) is about 26. When $\gamma$ is 1.9, a gradation level that leads to a transmittance equal to the value (0.013%) is about 23. That is, when $\gamma$ is 2.2, the low gradation level region has 32 gradation levels, whereas when $\gamma$ is 2.0 and 1.9, changes in transmittance corresponding to 6 gradation levels and 9 gradation levels, respectively, disappear (in other words, a difference in luminance displayed disappears, leading to display degradation in the low gradation level region). When γ is 2.0, the amount of change (Δγ) is 0.2. In this case, the gradation level shifts from a gradation level of 32, which is the reference of the low gradation level region, by 6. The shift of a gradation level of 6 is within a 20% change in gradation level with respect to the 32 gradation levels and is allowable because no extreme display degradation occurs. In contrast, when γ is 1.9, the amount of change (Δγ) is 0.3. The same comparison is made and demonstrates that the gradation level shifts by 9 (28%). In this case, we would have to say that significant display degradation occurs in the technical field of the present invention and is not allowable. As described above, it is possible to suppress the shift of the gradation level in the allowable range. Thus, when Δγ is 0.2 or less, color representation can be smoothly performed, and excellent display quality is achieved.

Figure 8:
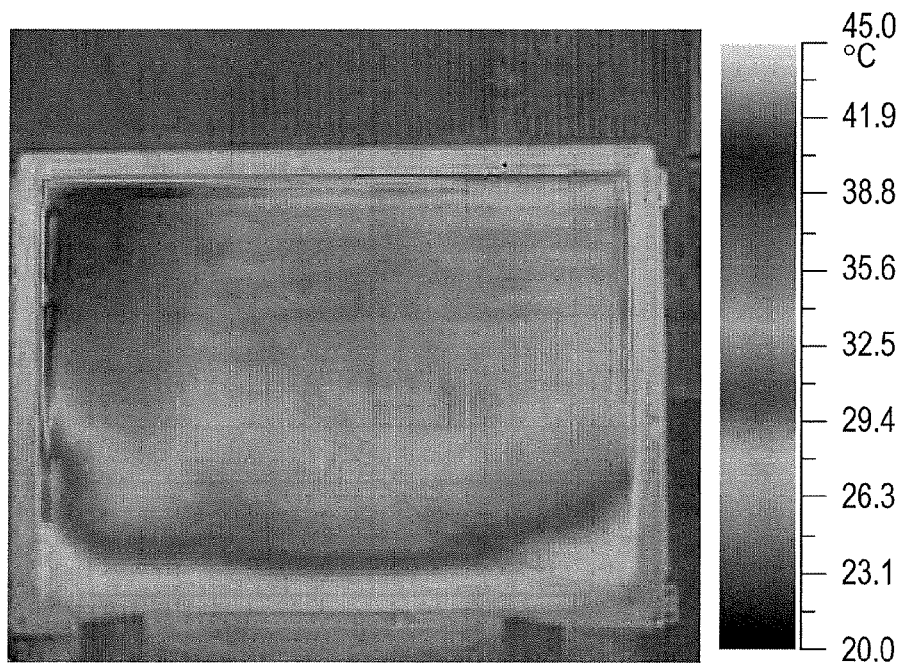
FIG. 8 illustrates the panel surface temperature distribution of a liquid crystal display device measured by thermography.
Figure 9:
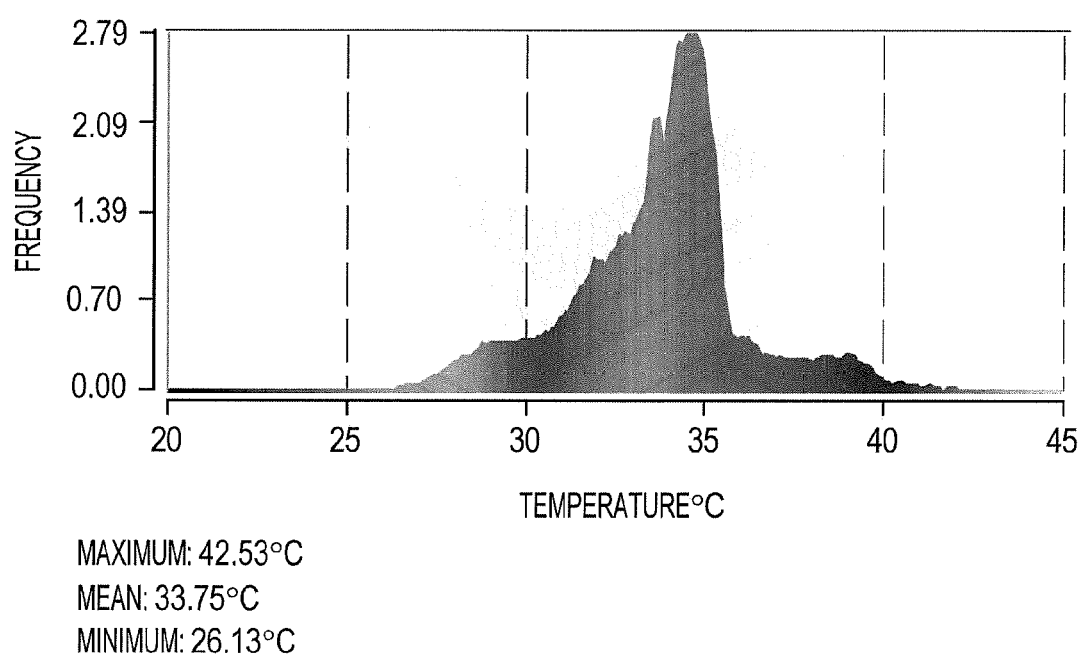
FIG. 9 is a graph illustrating the relationship between the temperature (° C.) and the frequency (%) of the temperature distribution illustrated in FIG. 8.

FIGS. 8 and 9 illustrate data from the measurement of the surface temperature of a liquid crystal display device by thermography. FIG. 8 illustrates the panel surface temperature distribution of the liquid crystal display device measured by thermography. A backlight used in FIG. 8 is, for example, a cold cathode fluorescent lamp (CCFL). FIG. 8 illustrates measurement results at a normal temperature environment. An inverter circuit configured to turn on the CCFL is arranged on the back of the liquid crystal display panel. The surface temperature is increased by heat from the inverter circuit. FIG. 9 is a graph illustrating the relationship between the temperature (° C.) and the frequency (%) of the temperature distribution illustrated in FIG. 8.

As is clear from FIGS. 8 and 9, the range of the surface temperature distribution is 15° C. or more. Depending on the type of backlight, the surface temperature distribution can be broader than the foregoing temperature distribution range because of nonuniform arrangement of a light source and/or a circuit, a variable-luminance light source, or a mechanism including a circuit configured to operate a backlight. Thus, in a common liquid crystal display device, it is found that an increase in temperature needs to be controlled by devising a light source, a circuit required to turn on the light source, and a mechanism including the circuit to achieve a uniform temperature distribution in a display region. Even when a liquid crystal display device has a surface temperature distribution, the implementation of this embodiment eliminates the need for a surface temperature-detecting circuit of the liquid crystal display device and a circuit configured to adjust the transmittance-gradation characteristics in response to temperature and successfully maintains the display quality against temperature changes. This results in a reduction in the cost of the liquid crystal display device and solves problems, such as the degradation of display performance.

Figure 10:
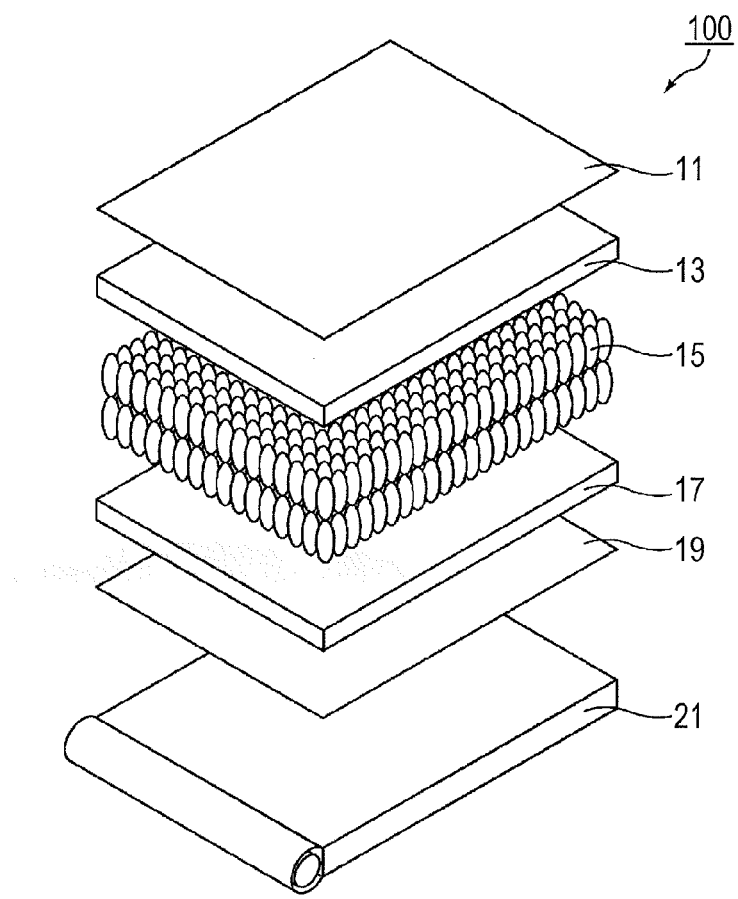
FIG. 10 is a schematic exploded perspective view illustrating a structure of a liquid crystal display panel and a light source according to an aspect of an embodiment.
Figure 11:
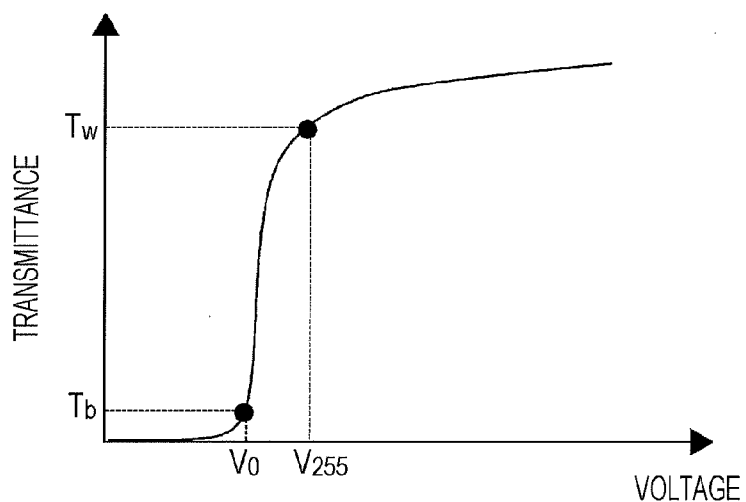
FIG. 11 is a graph illustrating the transmittance-voltage characteristics of a normally black (NB) display.
Figure 12:
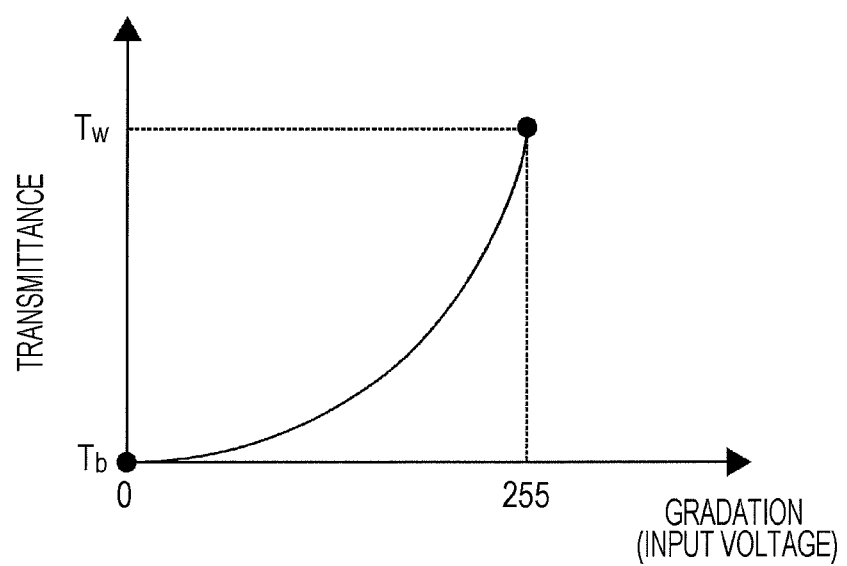
FIG. 12 is a graph illustrating the relationship between the transmittance and the gradation of a normally black (NB) display.

FIG. 10 is a schematic exploded perspective view illustrating a structure of a liquid crystal display panel and a light source according to an aspect of an embodiment.

The liquid crystal display panel according to this embodiment includes a liquid crystal medium containing a plurality of liquid crystal compounds each having a negative dielectric constant anisotropy, the liquid crystal medium being held between a first substrate (for example, a circuit board 17) and a second substrate (for example, a substrate 13 adjacent to a color filter) that are located opposite each other, and a side of each of the substrates in contact with the liquid crystal medium having vertical alignment properties for the liquid crystal compounds. A liquid crystal display panel 100 in FIG. 10 includes a polarizing plate 11, the substrate 13 adjacent to the color filter, a liquid crystal 15, the circuit board 17, and a polarizing plate 19.

In the liquid crystal display panel 100 illustrated in FIG. 10, an alignment layer is arranged on a side of the circuit board 17 adjacent to the liquid crystal 15, and an alignment layer is arranged on a side of the substrate 13 adjacent to the liquid crystal 15, the substrate 13 being located adjacent to the color filter. However, these alignment layers are not illustrated. The liquid crystal display panel illustrated in FIG. 10 may be appropriately provided with component members included in a common liquid crystal display panel. For example, the circuit board 17 includes an electrode, an interconnection, and an insulating film for a TFT, and the substrate 13 adjacent to the color filter includes a color filter, a common electrode, and so forth.

The liquid crystal display panel 100 illustrated in FIG. 10 is provided with an edge-lighting type light source (backlight) 21. Also in a liquid crystal display panel including such a light source, variations in the temperature of the surface region of the panel occur.

For example, in the cases where the operating temperature of the liquid crystal display panel according to this embodiment is changed with time because of a change in the environmental temperature of use and where the luminance of a backlight is adjusted in response to the quantity of external light to cause a temperature distribution in the surface region of the panel, thereby leading to different operating temperatures in the surface region of the liquid crystal display panel, this embodiment may be preferably applied. In the liquid crystal display panel according to this embodiment, the operating temperature range preferably includes 0° C. to 50° C.

The liquid crystal display panel according to an aspect of this embodiment is preferably irradiated with light from a light source arranged uniformly (entirely) for the liquid crystal display panel, the light being controlled in each of a plurality of regions (for example, a local dimming method).

The aspects of the embodiments described above may be appropriately combined without departing from the gist of the present invention.

The present application claims priority to Japanese Patent Application No. 2010-211156 filed Sep. 21, 2010 under the Paris Convention and provisions of national law in a designated State, the entire contents of which are hereby incorporated by reference.

REFERENCE SIGNS LIST 11, 19 polarizing plate
13 substrate adjacent to color filter
15 liquid crystal
17 TFT substrate (circuit board)
21 light source
100 liquid crystal display panel

The invention claimed is:
1. A liquid crystal display panel comprising a liquid crystal medium containing a plurality of liquid crystal compounds each having a negative dielectric constant anisotropy, the liquid crystal medium being held between a first substrate and a second substrate that are located opposite each other, and a side of each of the substrates in contact with the liquid crystal medium having vertical alignment properties for the liquid crystal compounds,
wherein the liquid crystal medium in the liquid crystal display panel contains a liquid crystal composition (1) or a liquid crystal composition (2) having a composition described below, the liquid crystal composition (1) or the liquid crystal composition (2) containing a plurality of liquid crystal compounds selected from the group consisting of compounds represented by general formulae (I-A) to (I-J):

[Chem. 1]

[Chem. 1]

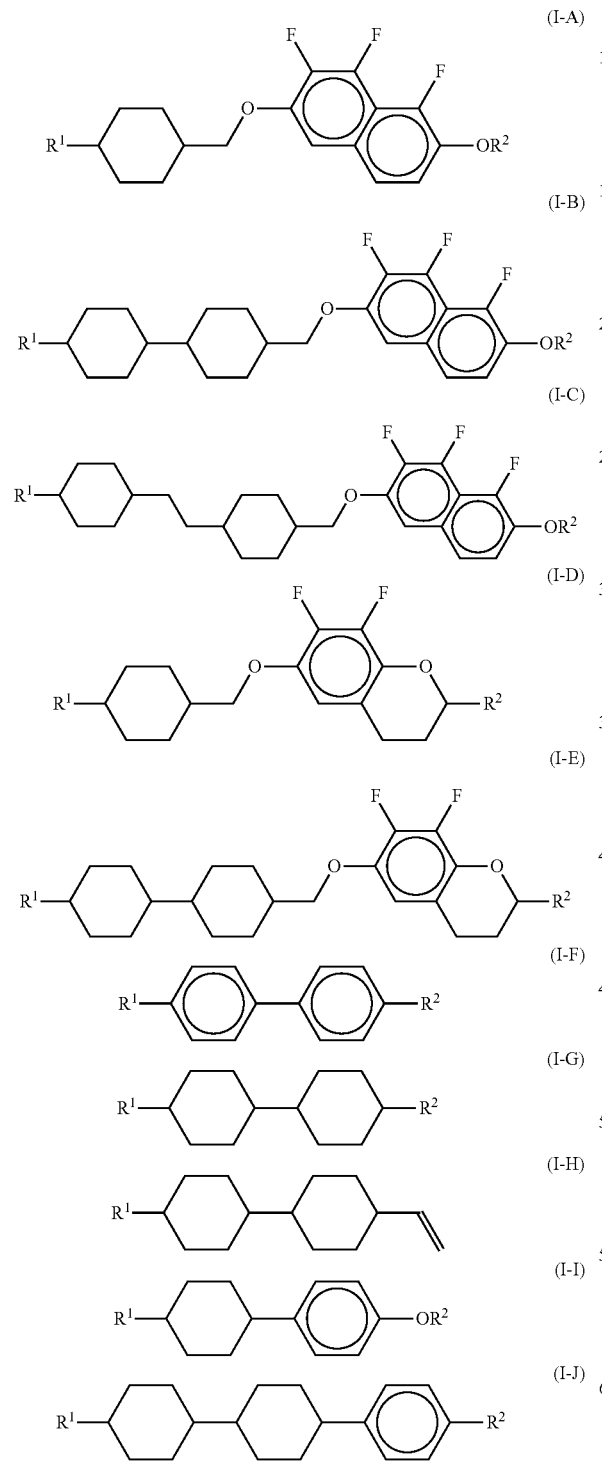

(in the general formulae, $R_1$ and $R_2$ are the same or different and each represent an alkyl group having 1 to 10 carbon atoms), wherein letting the total of the plural liquid crystal compounds in the liquid crystal composition be 100% by mass, the liquid crystal composition (1) contains two or more types of each of the compounds represented by general formulae (I-A), (I-B), and (I-C), the total content thereof being 20% to 25% by mass;

two or more types of each of the compounds represented by general formulae (I-D) and (I-E), the total content thereof being 10% to 15% by mass;

one or two or more types of each of the compounds represented by general formulae (I-F) and (I-J), the total content thereof being 25% to 30% by mass; and one or two or more types of each of the compounds represented by general formulae (I-G) and (I-I), the total content thereof being 35% to 40% by mass, the liquid crystal composition (2) contains two or more types of each of the compounds represented by general formulae (I-A), (I-B), and (I-C), the total content thereof being 20% to 25% by mass;

two or more types of each of the compounds represented by general formulae (I-D) and (I-E), the total content thereof being 10% to 15% by mass;

one or two or more types of each of the compounds represented by general formulae (I-F) and (I-J), the total content thereof being 25% to 30% by mass; and one or two or more types of each of the compounds represented by general formulae (I-G) and (I-H), the total content thereof being 35% to 40% by mass, and wherein in the liquid crystal display panel, $\Delta\gamma$ which pertains to a transmittance-gradation characteristic curve coefficient and which is calculated from expressions (1) and (2) described below is 0.2 or less,

[Math. 1]

$$\text{Transmittance}[T] = (Tw - Tb) \times \left[\frac{\text{gradation}}{255}\right]^{\gamma} + Tb \quad (1)$$

$$\Delta\gamma = |\gamma_{25°\,C.} - \gamma_{50°\,C.}| \quad (2)$$

wherein in the expressions, Tb represents a transmittance at a gradation level of zero, Tw represents a transmittance at a gradation level of 255, $\gamma_{25°\,C.}$ represents the coefficient $\gamma$ at 25° C. in expression (1) and is 2.2, and $\gamma_{50°\,C.}$ represents the $\gamma$ in expression (1) at 50° C. and is calculated in such a manner that a transmittance-gradation characteristic curve at 50° C. is most closely approximated to be a transmittance-gradation characteristic curve at 25° C.

2. The liquid crystal display panel according to claim 1, wherein the operating temperature range of the liquid crystal display panel includes 0° C. to 50° C.

3. The liquid crystal display panel according to claim 1, wherein in the liquid crystal composition, the transition temperature between a nematic phase and an isotropic liquid phase is in the range of 73° C. to 82° C., the transition temperature between a smectic phase or a glass phase and a nematic phase is in the range of −50° C. to −30° C., the refractive index anisotropy at 25° C. is in the range of 0.090 to 0.094, and the dielectric constant anisotropy at 25° C. is in the range of −3.1 to −2.5.

4. A transmissive-mode liquid crystal display device comprising the liquid crystal display panel according to claim 1, wherein the liquid crystal display device includes a light source.

5. The liquid crystal display device according to claim 4, wherein the arrangement of the light source is nonuniform for the liquid crystal display panel, or the luminance of the light source is variable.

* * * * *